(12) United States Patent
Li et al.

(10) Patent No.: US 12,539,621 B1
(45) Date of Patent: Feb. 3, 2026

(54) BIOMIMETIC DEXTEROUS FINGERS AND BIOMIMETIC ROBOTS

(71) Applicant: HUMANOID ROBOT (SHANGHAI) CO., LTD., Shanghai (CN)

(72) Inventors: Yongyao Li, Shanghai (CN); Yufei Liu, Shanghai (CN); Lei Jiang, Shanghai (CN)

(73) Assignee: Humanoid Robot (Shanghai) Co., Ltd., Shanghai (CN)

( * ) Notice: Subject to any disclaimer, the term of this patent is extended or adjusted under 35 U.S.C. 154(b) by 0 days.

(21) Appl. No.: 19/220,038

(22) Filed: May 27, 2025

Related U.S. Application Data

(63) Continuation of application No. PCT/CN2025/097007, filed on May 23, 2025.

(30) Foreign Application Priority Data

Jan. 17, 2025 (CN) .......................... 202510073199.9

(51) Int. Cl.
*B25J 15/08* (2006.01)
(52) U.S. Cl.
CPC ..................... *B25J 15/08* (2013.01)
(58) Field of Classification Search
CPC ..................................................... B25J 15/08
See application file for complete search history.

(56) References Cited

U.S. PATENT DOCUMENTS

| 8,915,528 B2 * | 12/2014 | Haslinger | ................ B25J 9/102 623/64 |
| 8,936,289 B1 * | 1/2015 | Kozlowski | ........... B25J 19/0091 901/45 |

(Continued)

FOREIGN PATENT DOCUMENTS

| CN | 101422906 B | 1/2011 |
| CN | 102873690 A | 1/2013 |

(Continued)

OTHER PUBLICATIONS

The First Office Action dated Feb. 27, 2025 for Chinese Application No. 202510073199.9.

(Continued)

*Primary Examiner* — Stephen A Vu

(57) ABSTRACT

A biomimetic dexterous finger and a biomimetic robot, the biomimetic dexterous finger including: a finger body, a driving assembly and a transmission assembly; where the driving assembly is provided at a metacarpophalangeal joint of a palm and includes a driving screw rod; the transmission assembly includes a moving mechanism, a connecting mechanism and a flexible mechanism, the moving mechanism is in transmission connection with the driving screw rod, the flexible mechanism is connected to the moving mechanism, and the connecting mechanism is rotatably connected to the flexible mechanism and is also rotatably connected to a finger root of a finger body; the driving assembly drives the flexible mechanism to be elastically deformed and drives the finger body to bend towards or away from a center of the palm, making the driving assembly having a flexible output characteristic.

14 Claims, 7 Drawing Sheets

(56) References Cited

U.S. PATENT DOCUMENTS

| | | | |
|---|---|---|---|
| 8,936,290 B1* | 1/2015 | Salisbury | B25J 15/0009 |
| | | | 294/111 |
| 9,669,551 B1* | 6/2017 | Salisbury | B25J 15/0009 |
| 2011/0163561 A1* | 7/2011 | Kim | B25J 9/104 |
| | | | 294/111 |
| 2020/0047351 A1 | 2/2020 | Zappatore | |

FOREIGN PATENT DOCUMENTS

| | | |
|---|---|---|
| CN | 208529127 U | 2/2019 |
| CN | 209713579 U | 12/2019 |
| CN | 113370256 B | 1/2023 |
| CN | 114734469 B | 8/2023 |
| CN | 219705198 U | 9/2023 |
| CN | 117047809 A | 11/2023 |
| CN | 117917314 A | 4/2024 |
| CN | 118123871 A | 6/2024 |
| CN | 118952274 A | 11/2024 |
| CN | 119077779 A | 12/2024 |
| CN | 119501982 A | 2/2025 |
| EP | 1 457 294 A1 | 9/2004 |
| GB | 1201182 A | 8/1970 |

OTHER PUBLICATIONS

Notice of Grant of Patent for Invention dated Mar. 27, 2025 for Chinese Application No. 202510073199.9.

* cited by examiner

BIOMIMETIC DEXTEROUS FINGERS AND BIOMIMETIC ROBOTS

CROSS-REFERENCE TO RELATED APPLICATIONS

This application is a continuation of International Application No. PCT/CN2025/097007, filed on May 23, 2025, which claims priority to Chinese Patent Application No. 202510073199.9, filed with the China National Intellectual Property Administration on Jan. 17, 2025 and entitled "BIOMIMETIC DEXTEROUS FINGER AND BIOMIMETIC ROBOT", both of which are hereby incorporated by reference in their entireties

TECHNICAL FIELD

The present disclosure relates to the technical field of robots, and in particular, to a biomimetic dexterous finger and a biomimetic robot.

BACKGROUND

In the related art, a finger-root of a biomimetic dexterous finger of robot is fixedly connected to a metacarpophalangeal joint of a palm, and the biomimetic dexterous finger only has a freedom degree of bending towards or away from a center of the palm, without a function of leftward and rightward swinging. Meanwhile, the finger root of the biomimetic dexterous finger of robot and the metacarpophalangeal joint of the palm are directly connected to a drive motor through a screw rod, which results in poor impact resistance and flexibility. During use, the finger is easily damaged when being impacted by an external force, and the drive motor may be even damaged.

SUMMARY

In view of the above-described problems, the present disclosure provides a biomimetic dexterous finger and a biomimetic robot, so as to solve the problems in the related art that a five-finger dexterous hand cannot swing left and right, and the five-finger dexterous hand is easily damaged when being impacted by an external force.

In order to achieve the above-described object, the present disclosure provides the following technical solutions.

The present disclosure provides a biomimetic dexterous finger, including: a finger body, a driving assembly and a transmission assembly; where the driving assembly is provided at a metacarpophalangeal joint of a palm, and a driving screw rod is extended outwards from the driving assembly; the transmission assembly includes a moving mechanism, a connecting mechanism and a flexible mechanism, where the moving mechanism is in transmission connection with the driving screw rod, the flexible mechanism is connected to the moving mechanism, one end of the connecting mechanism is rotatably connected to the flexible mechanism, and the other end of the connecting mechanism is rotatably connected to a finger root of the finger body; the driving assembly drives the flexible mechanism to be elastically deformed and drives the connecting mechanism to bend the finger body towards or away from a center of the palm; and when the driving assembly stops working and the finger body is subjected to an external force along a first horizontal direction, the finger body drives the connecting mechanism to swing along the first horizontal direction, the connecting mechanism drives the flexible mechanism to be elastically deformed, and the flexible mechanism is elastically restored to drive the finger body to reset; or when the driving assembly works and the finger body is subjected to an external force in any direction, the finger body drives the connecting mechanism to swing, the connecting mechanism drives the flexible mechanism to be elastically deformed, and the flexible mechanism is elastically restored to drive the finger body to reset.

In a possible implementation, along the first horizontal direction, the moving mechanism has a first wall surface and a second wall surface that are opposite to each other, where the first wall surface is provided with a first connecting protrusion, and the second wall surface is provided with a second connecting protrusion; the flexible mechanism includes a first flexible mechanism and a second flexible mechanism, where the first flexible mechanism is connected to the first connecting protrusion, and the second flexible mechanism is connected to the second connecting protrusion; the connecting mechanism includes a first connecting rod and a second connecting rod, where one end of the first connecting rod is rotatably connected to the first flexible mechanism, one end of the second connecting rod is rotatably connected to the second flexible mechanism, and the other end of the first connecting rod and the other end of the second connecting rod are both rotatably connected to the finger root of the finger body; and when the finger body swings towards an orientation where the first flexible mechanism is located or the finger body swings towards an orientation where the second flexible mechanism is located, the first flexible mechanism and the second flexible mechanism can both move along a second horizontal direction and the first flexible mechanism and the second flexible mechanism are opposite in a moving direction, and both the first flexible mechanism and the second flexible mechanism are elastically deformed; and when the finger body bends towards or away from the center of the palm, the first flexible mechanism and the second flexible mechanism can both move along the second horizontal direction and the first flexible mechanism and the second flexible mechanism are the same in the moving direction, and both the first flexible mechanism and the second flexible mechanism are elastically deformed; and where the second horizontal direction is perpendicular to the first horizontal direction.

In a possible implementation, along a vertical direction, the moving mechanism has a bottom surface, where the bottom surface is provided with a third connecting protrusion, and the flexible mechanism is connected to the third connecting protrusion; and the connecting mechanism includes a third connecting rod, one end of the third connecting rod is rotatably connected to the flexible mechanism, and the other end of the third connecting rod is rotatably connected to the finger root of the finger body.

In a possible implementation, the first flexible mechanism includes: a first connecting block, a first lower connecting rod, a first front spring and a first rear spring; where the first connecting block is provided with a first connecting hole, the first connecting hole has a first central axis parallel to the first horizontal direction, and one end of the first connecting rod is rotatably connected to the first connecting hole; the first connecting block is further provided with a first protruding block and a second protruding block which are opposite to each other and spaced apart along the second horizontal direction, and the first connecting protrusion is provided between the first protruding block and the second protruding block; the first protruding block is provided with a second connecting hole, the second protruding block is provided with a third connecting hole, the first connecting protrusion is provided with a fourth connecting hole, where the second connecting hole, the third connecting hole and the fourth connecting hole each have a second central axis, and the second central axis is parallel to the second horizontal direction; the first lower connecting rod is slidably connected with each of the second connecting hole, the third connecting hole and the fourth connecting hole; and the first front spring and the first rear spring are both sleeved on the first lower connecting rod, one end of the first front spring and other end of the first front spring along an elastic expansion and contraction direction of the first front spring are respectively abutted against the first protruding block and the first connecting protrusion, and one end of the first rear spring and other end of the first rear spring along an elastic expansion and contraction direction of the first rear spring are respectively abutted against the second protruding block and the first connecting protrusion.

In a possible implementation, the first flexible mechanism further includes: a first upper connecting rod; the first protruding block is provided with a fifth connecting hole, the second protruding block is provided with a sixth connecting hole, and the first connecting protrusion is provided with a seventh connecting hole, where central axes of the fifth connecting hole, the sixth connecting hole and the seventh connecting hole coincide with each other, and the central axis of the fifth connecting hole is spaced apart from the second central axis in the vertical direction and is parallel to the second horizontal direction; and the first upper connecting rod is slidably connected with each of the fifth connecting hole, the sixth connecting hole and the seventh connecting hole.

In a possible implementation, the biomimetic dexterous finger further includes: a bracket, where the moving mechanism and the flexible mechanism are both provided inside the bracket; the bracket includes a first sidewall and a second sidewall along the second horizontal direction, where the first sidewall is provided with a first through-hole, the second sidewall is provided with a second through-hole, the driving screw rod is provided in the bracket from the first through-hole, a bearing seat is provided inside the second through-hole, and an end of the driving screw rod is rotatably connected to the bearing seat; and the second sidewall is further provided with an avoidance opening, one end of the connecting mechanism is provided in the bracket, and the other end of the connecting mechanism extends out of the bracket from the avoidance opening and is rotatably connected to the finger root of the finger body.

In a possible implementation, the first sidewall is further provided with a third through-hole, the second sidewall is further provided with a fourth through-hole, and one end of the first lower connecting rod and other end of the first lower connecting rod along the second horizontal direction are respectively fixedly connected with the third through-hole and the fourth through-hole; and the first sidewall is further provided with a fifth through-hole, the second sidewall is further provided with a sixth through-hole, and one end of the first upper connecting rod and other end of the first upper connecting rod along the second horizontal direction are respectively fixedly connected with the fifth through-hole and the sixth through-hole.

In a possible implementation, an arc-shaped support plate is provided on an outer wall surface of the first sidewall away from the second sidewall, and the driving assembly is provided on the arc-shaped support plate.

In a possible implementation, the connecting mechanism further includes a first ball head rod and a second ball head rod, where the first ball head rod includes a first ball head and a first rod segment that are adjacent to each other along the first horizontal direction, and the second ball head rod includes a second ball head and a second rod segment that are adjacent to each other along the first horizontal direction; one end of the first connecting rod is provided with a first annular connecting member, the first annular connecting member is rotatably connected to the first ball head, and the first rod segment is fixedly connected to the first flexible mechanism; one end of the second connecting rod is provided with a second annular connecting member, the second annular connecting member is rotatably connected to the second ball head, and the second rod segment is fixedly connected to the second flexible mechanism; the connecting mechanism further includes a third ball head rod having a first end and a second end arranged opposite to each other, and both the first end and the second end are fixedly connected to the finger root of the finger body; and the third ball head rod is further provided with a third ball head and a fourth ball head spaced apart from each other along the first horizontal direction, the other end of the first connecting rod is provided with a third annular connecting member, the other end of the second connecting rod is provided with a fourth annular connecting member, the third annular connecting member is rotatably connected to the third ball head, and the fourth annular connecting member is rotatably connected to the fourth ball head.

The present disclosure further provides a biomimetic robot, including the biomimetic dexterous finger as described above.

The biomimetic robot provided in the present disclosure has the technical effects as below.

When the driving assembly drives the finger body to bend towards or away from the center of the palm, the finger body can swing laterally upon the right or left side of the finger body being subjected to the external force. Meanwhile, when the driving assembly does not drive the finger body to bend towards or away from the center of the palm, the finger body can also swing laterally upon the right side or the left side of the finger body being subjected to the external force.

When the finger body swings laterally or is subjected to an impact force in any direction, the elastic deformation of the flexible mechanism can counteract most of the impact force, so as to achieve the effects of impact resistance and shock absorption, and prevent damage to the finger root of the finger body when being impacted by the external force.

At the same time, the drive on the connecting mechanism by the driving assembly is also firstly transmitted to the finger body through the flexible mechanism, so that the driving assembly has a better flexible output characteristic, which provides a certain protection effect on the driving assembly.

In addition to the technical problems to be solved in the present disclosure, the technical features constituting the technical solutions, and the beneficial effects brought by the technical features of these technical solutions as described above, other technical problems provided in the present disclosure, other technical features included in the technical solutions, and the beneficial effects brought by these technical features will be further described in detail in the specific embodiments.

BRIEF DESCRIPTION OF THE DRAWINGS

In order to illustrate the technical solutions in the embodiments of the present disclosure or in the background more clearly, the accompanying drawings required in the embodiments of the present disclosure or in the background will be explained below.

Figure 1:
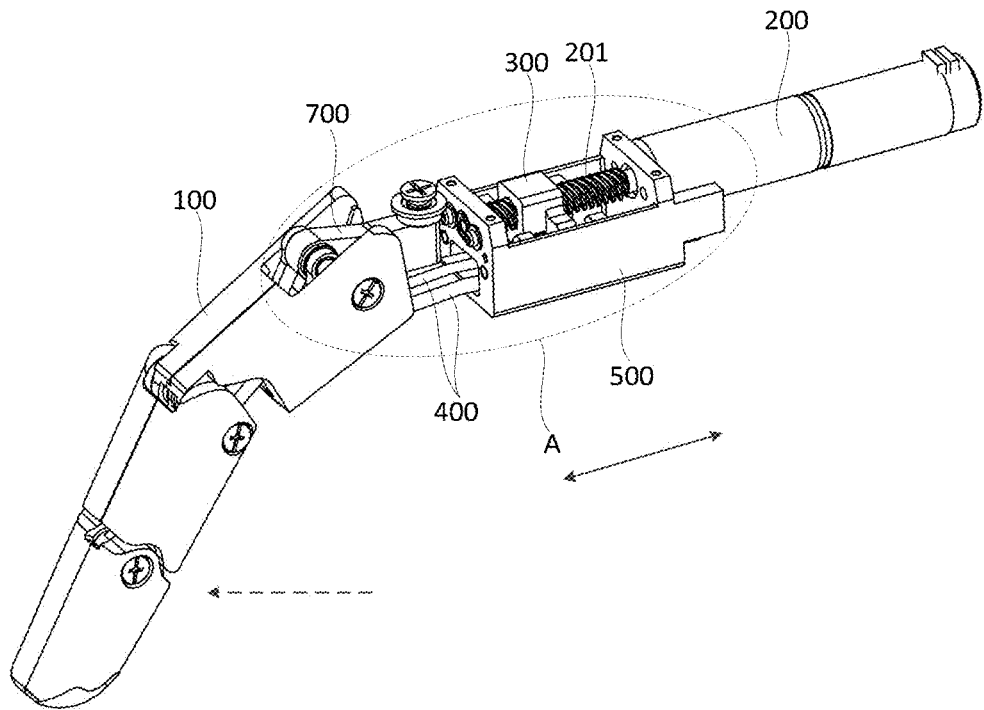
FIG. 1 is a schematic structural diagram of a biomimetic dexterous finger provided by an embodiment of the present disclosure.

REFERENCE NUMERALS 100-finger body;
200-driving assembly;
201-driving screw rod;
300-moving mechanism; 300a-first wall surface; 300b-second wall surface;
301-first connecting protrusion; 302-second connecting protrusion; 304-avoidance groove;
3011-fourth connecting hole; 3012-seventh connecting hole;
400-connecting mechanism;
401-first connecting rod; 402-second connecting rod; 403-third ball head rod; 404-first ball head rod; 405-second ball head rod;
4011-first annular connecting member; 4012-third annular connecting member; 4021-second annular connecting member; 4022-fourth annular connecting member; 4031-third ball head; 4032-fourth ball head; 4041-first rod segment; 4042-first ball head; 4051-second rod segment; 4052-second ball head;
500-bracket;
501-first sidewall; 502-second sidewall; 503-arc-shaped support plate;
5011-first through-hole; 5021-second through-hole; 5022a-third through-hole; 5022-fourth through-hole; 5023a-fifth through-hole; 5023-sixth through-hole; 5024-avoidance opening; 5025-bearing seat;
610-first flexible mechanism; 620-second flexible mechanism;
601-first connecting block; 602-first lower connecting rod; 603-first front spring; 604-first rear spring; 605-first upper connecting rod;
621-second connecting block; 622-second lower connecting rod; 623-second front spring; 624-second rear spring; 625-second upper connecting rod;
6011-first protruding block; 6012-second protruding block; 6013-first connecting hole; 6014-second connecting hole; 6015-third connecting hole; 6016-fifth connecting hole; 6017-sixth connecting hole; and
700-swinging assembly.

DESCRIPTION OF EMBODIMENTS

In order to make the above-mentioned objectives, features, and advantages in the embodiments of the present disclosure more obvious and understandable, the technical solutions in the embodiments of the present disclosure will be clearly and completely described below in conjunction with the accompanying drawings. Obviously, the described embodiments are only a part rather than all of the embodiments of the present disclosure. All other embodiments obtained by those ordinary skilled in the art based on the embodiments of the present disclosure without creative efforts shall belong to the protection scope of the present disclosure.

The orientations involved in the embodiments of the present disclosure include as follows. A first horizontal direction refers to an X-axis in the figures, that is, a left-right direction of a finger body; and a second horizontal direction refers to a Y-axis in the figures, that is, a front-rear direction of the finger body. The first horizontal direction is perpendicular to the second horizontal direction. The phrase "moving forward" in the embodiments of the present disclosure refers to moving in a direction where the finger body is away from a center of a palm, while the phrase "moving backward" in the embodiments of the present disclosure refers to moving in a direction where the finger body gets close to the center of the palm.

Figure 5:
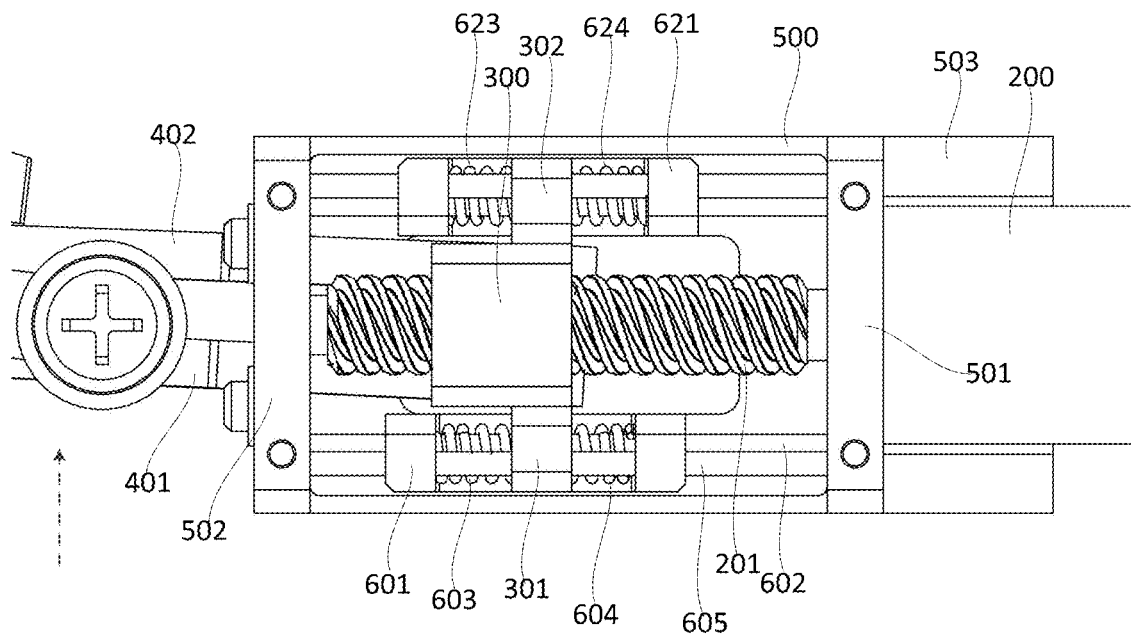
FIG. 5 is an enlarged view of portion C in FIG. 4.
Figure 7:
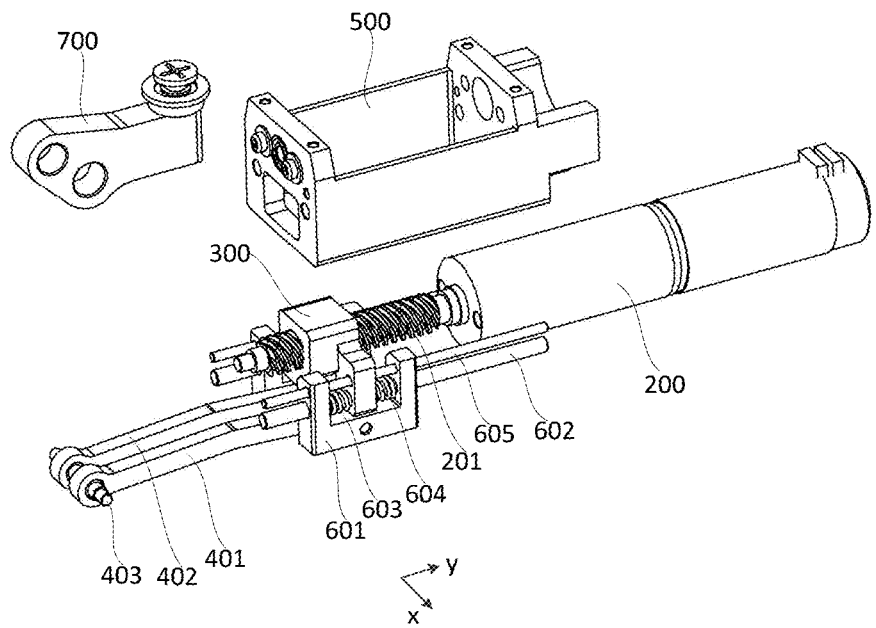
FIG. 7 is a first exploded view of portion A in FIG. 1.

Referring to FIGS. 1, 5 and 7, the embodiments of the present disclosure provide a biomimetic dexterous finger which includes a finger body 100 and a driving assembly 200, where the driving assembly 200 is provided at a metacarpophalangeal joint of a palm, and an output shaft of the driving assembly 200 is connected to a finger root of the finger body 100, so that the driving assembly 200 can drive the finger body 100 to bend towards or away from the center of the palm.

The biomimetic dexterous finger further includes a swinging assembly 700 which is rotatably connected to the finger root of the finger body 100, and when the finger body 100 bends towards or away from the center of the palm, the swinging assembly 700 has a function of balancing forces.

The driving assembly 200 may be a driving motor, and the output shaft of the driving assembly 200 may be a driving screw rod 201.

The biomimetic dexterous finger further includes a transmission assembly.

The transmission assembly includes a moving mechanism 300, a connecting mechanism 400 and a flexible mechanism.

The moving mechanism 300 is in transmission connection with the driving screw rod 201, and when the driving assembly 200 controls the driving screw rod 201 to rotate clockwise or counterclockwise, the moving mechanism 300 can move on the driving screw rod 201.

The moving mechanism 300 may be a nut that can be meshed with the driving screw rod 201.

In the present disclosure, when the driving assembly 200 controls the driving screw rod 201 to rotate clockwise, the moving mechanism 300 can move on the driving screw rod 201, and the moving mechanism 300 will move from the palm to the finger body 100; and when the driving assembly 200 controls the driving screw rod 201 to rotate counterclockwise, the moving mechanism 300 can move on the driving screw rod 201, and the moving mechanism 300 will move from the finger body 100 to the palm.

The flexible mechanism is connected to the moving mechanism 300, one end of the connecting mechanism 400 is rotatably connected to the flexible mechanism, and the other end of the connecting mechanism 400 is rotatably connected to the finger root of the finger body 100.

When the driving assembly 200 controls the driving screw rod 201 to rotate clockwise or counterclockwise, the moving mechanism 300 drives the flexible mechanism to move. However, at this moment, the connecting mechanism 400 remains stationary, and the flexible mechanism is subjected to pulling forces in different directions which are simultaneously applied by the moving mechanism 300 and the connecting mechanism 400, so that the flexible mechanism is elastically deformed. While the flexible mechanism undergoes elastic deformation, the flexible mechanism drives the connecting mechanism 400 to rotate, so that the connecting mechanism 400 can drive the finger root of the finger body 100 to rotate, and the finger body 100 can bend towards or away from the center of the palm.

The elastic deformation of the flexible mechanism can counteract a part of an output force of the driving assembly 200. That is to say, the drive of the driving assembly 200 on the connecting mechanism 400 is also firstly transmitted to the finger body 100 through the flexible mechanism, which makes the driving assembly 200 have better flexible output characteristic, and provides a certain protection effect on the driving assembly 200.

The driving assembly 200 stops working, which means that the driving assembly 200 does not control the driving screw rod 201 to rotate. At this time, when a right or left side of the finger body 100 is subjected to an external force along the first horizontal direction (the left-right direction of the finger body 100 in FIG. 1), the finger body 100 will swing laterally along the first horizontal direction; and when the finger body 100 swings laterally, it drives the connecting mechanism 400 to swing leftward or rightward, and when the connecting mechanism 400 swings leftward or rightward, a pulling force will be applied to the flexible mechanism. Since the driving screw rod 201 stops rotation at this time, the moving mechanism 300 remains stationary on the driving screw rod 201, and the flexible mechanism is subjected to forces in different directions which are simultaneously applied by the moving mechanism 300 and the connecting mechanism 400, so that the flexible mechanism is elastically deformed and it drives the finger body 100 to reset upon being elastically restored.

When the driving assembly 200 does not control the driving screw rod 201 to rotate, the finger body 100 will drive the connecting mechanism 400 to swing in the case that the finger body 100 is subjected to the external force in any direction. When the connecting mechanism 400 swings, the flexible mechanism will be elastically deformed. The elastic deformation of the flexible mechanism can counteract most of the impact force, thereby achieving the effects of impact resistance and shock absorption, and preventing damage to the finger root of the finger body 100 when being impacted by the external force.

In other words, when the driving assembly 200 stops working and the finger body 100 is subjected to the external force along the first horizontal direction, the finger body 100 drives the connecting mechanism 400 to swing along the first horizontal direction, the connecting mechanism 400 drives the flexible mechanism to be elastically deformed, and the flexible mechanism is elastically restored to drive the finger body 100 to reset. Alternatively, when the driving assembly 200 works and the finger body 100 is subjected to an external force in any direction, the finger body 100 drives the connecting mechanism 400 to swing, the connecting mechanism 400 drives the flexible mechanism to be elastically deformed, and the flexible mechanism is elastically restored to drive the finger body 100 to reset.

It should be noted that one end of the connecting mechanism 400 is rotatably connected to the flexible mechanism and the other end of the connecting mechanism 400 is rotatably connected to the finger root of the finger body 100, which means that both ends of the connecting mechanism 400 can rotate around the first horizontal direction axis (the left-right direction of the finger body 100 in FIG. 1), thereby realizing the bending of the finger body 100.

It should also be noted that, when the driving assembly 200 controls the driving screw rod 201 to rotate and the finger body 100 bends towards or away from the center of the palm, the finger body 100 is impacted by the external force in any direction and can also drive the connecting mechanism 400 to swing, so that the flexible mechanism is elastically deformed so as to counteract the impact force, thereby achieving the effects of impact resistance and shock absorption and preventing damage to the finger root of the finger body 100 when the finger body 100 is impacted by the external force during use.

Figure 2:
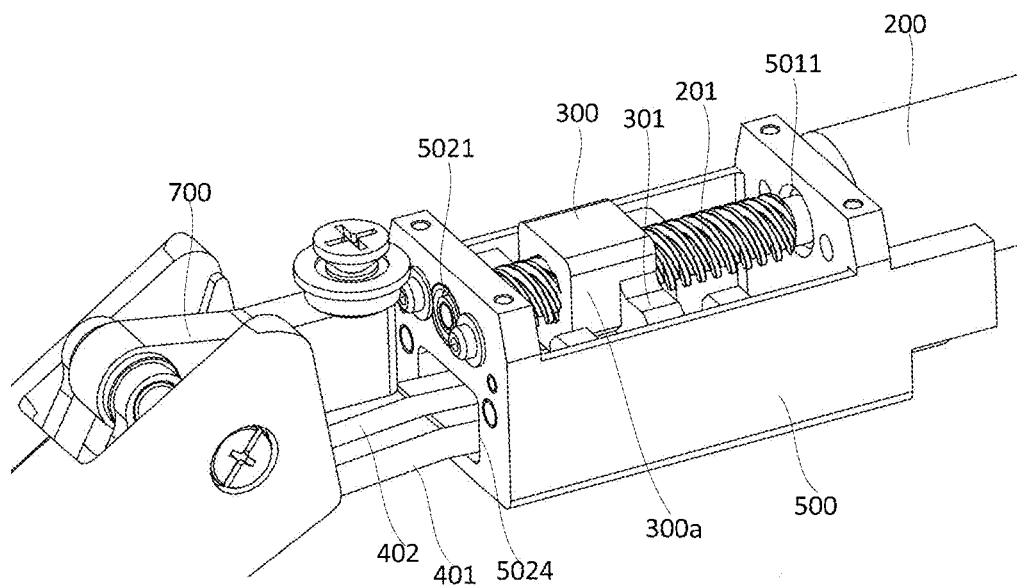
FIG. 2 is an enlarged view of portion A in FIG. 1.
Figure 3:
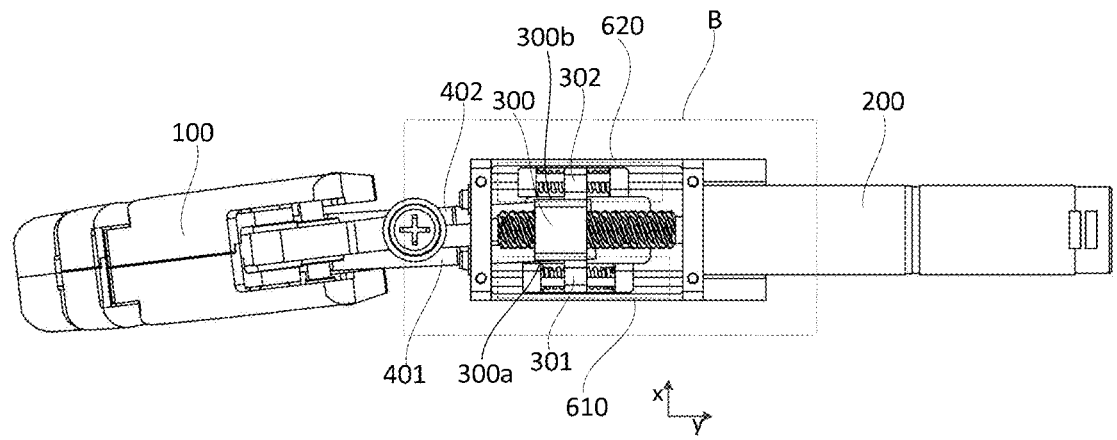
FIG. 3 is a state diagram of a biomimetic dexterous finger swinging to a left side provided by an embodiment of the present disclosure.
Figure 4:
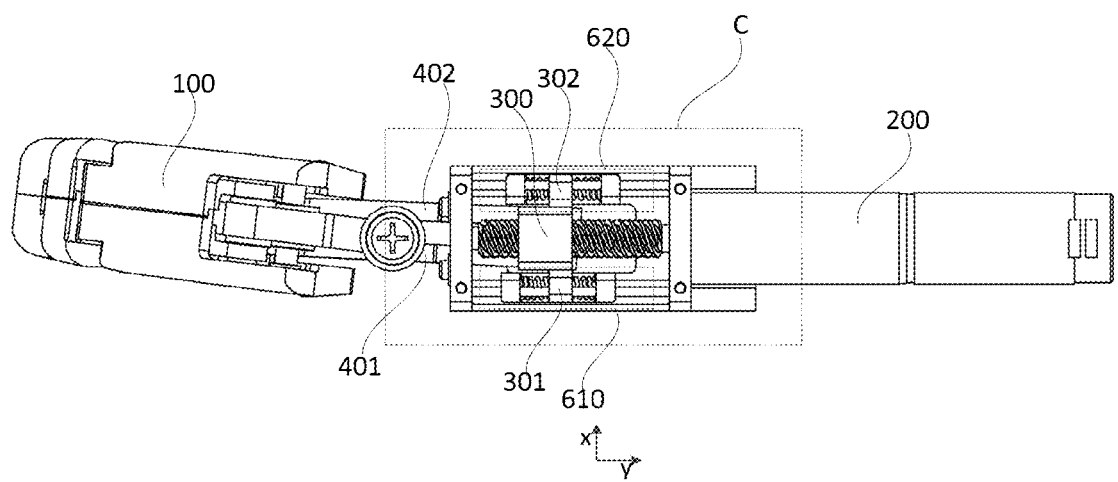
FIG. 4 is a state diagram of a biomimetic dexterous finger swinging to a right side provided by an embodiment of the present disclosure.

As shown in FIGS. 2, 3 and 4, in the embodiments of the present disclosure, the moving mechanism 300 has a first wall surface 300a and a second wall surface 300b that are opposite to each other along the first horizontal direction (the left-right direction of the finger body 100 in FIG. 1). The first wall surface 300a is provided with a first connecting protrusion 301, and the second wall surface 300b is provided with a second connecting protrusion 302.

The flexible mechanism includes a first flexible mechanism 610 and a second flexible mechanism 620. The first flexible mechanism 610 and the second flexible mechanism 620 are respectively provided at two sides of the moving mechanism 300 along the first horizontal direction, the first flexible mechanism 610 is connected to the first connecting protrusion 301, and the second flexible mechanism 620 is connected to the second connecting protrusion 302.

The connecting mechanism 400 includes a first connecting rod 401 and a second connecting rod 402. One end of the first connecting rod 401 is rotatably connected to the first flexible mechanism 610, one end of the second connecting rod 402 is rotatably connected to the second flexible mechanism 620, and the other end of the first connecting rod 401 and the other end of the second connecting rod 402 are both rotatably connected to the finger root of the finger body 100.

As shown in FIG. 3, when the finger body 100 is impacted and swings laterally towards the orientation where the first flexible mechanism 610 is located, both the first flexible mechanism 610 and the second flexible mechanism 620 can move along the second horizontal direction (the y direction in FIG. 3), and the first flexible mechanism 610 and the second flexible mechanism 620 have opposite moving directions. The first connecting rod 401 drives the first flexible mechanism 610 to move backward along the second horizontal direction (the y direction in FIG. 3), the second connecting rod 402 drives the second flexible mechanism 620 to move forward along the second horizontal direction (the y direction in FIG. 3), and both the first flexible mechanism 610 and the second flexible mechanism 620 are elastically deformed.

As shown in FIG. 4, when the finger body 100 is impacted and swings laterally towards the orientation where the second flexible mechanism 620 is located, both the first flexible mechanism 610 and the second flexible mechanism 620 can move along the second horizontal direction (the y direction in FIG. 3), and the first flexible mechanism 610 and the second flexible mechanism 620 have opposite moving directions. The first connecting rod 401 drives the first flexible mechanism 610 to move forward along the second horizontal direction (the y direction in FIG. 4), the second connecting rod 402 drives the second flexible mechanism 620 to move backward along the second horizontal direction (the y direction in FIG. 4), and both the first flexible mechanism 610 and the second flexible mechanism 620 are elastically deformed.

The first flexible mechanism 610 and the second flexible mechanism 620 are respectively provided on the left and right sides of the moving mechanism 300, which solves the problem of uneven force distribution on the left and right sides of the moving mechanism 300 when the finger body 100 swings laterally, thereby achieving the effects of impact resistance and shock absorption while ensuring a smooth transition of the finger body 100 in the process of lateral swinging.

Meanwhile, the first flexible mechanism 610 and the second flexible mechanism 620 are respectively provided on the left and right sides of the moving mechanism 300, making the whole structure of the transmission assembly compact and easy to be integrated into a motor module.

Figure 13:
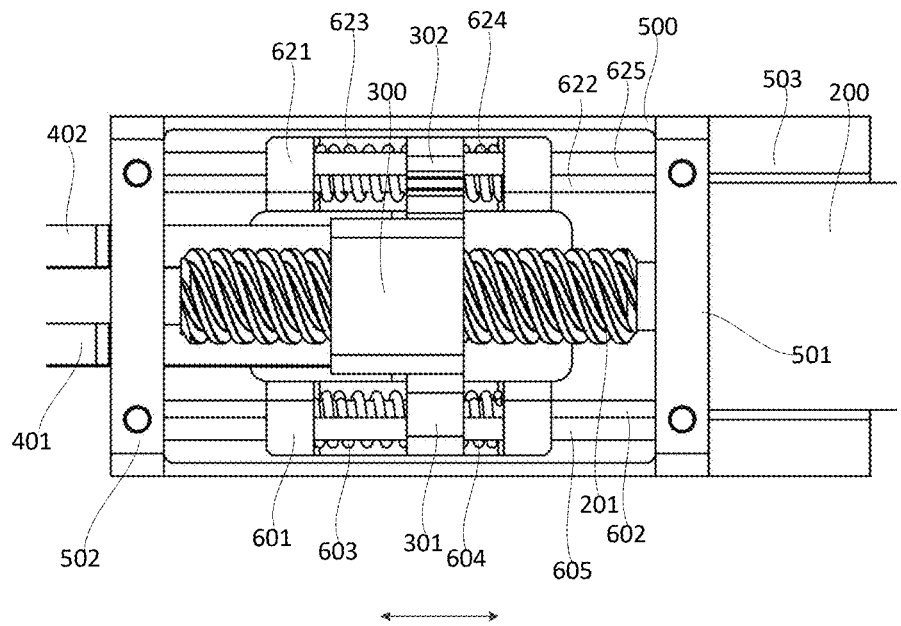
FIG. 13 is a state diagram of the bending of a biomimetic dexterous finger provided by an embodiment of the present disclosure.
Figure 14:
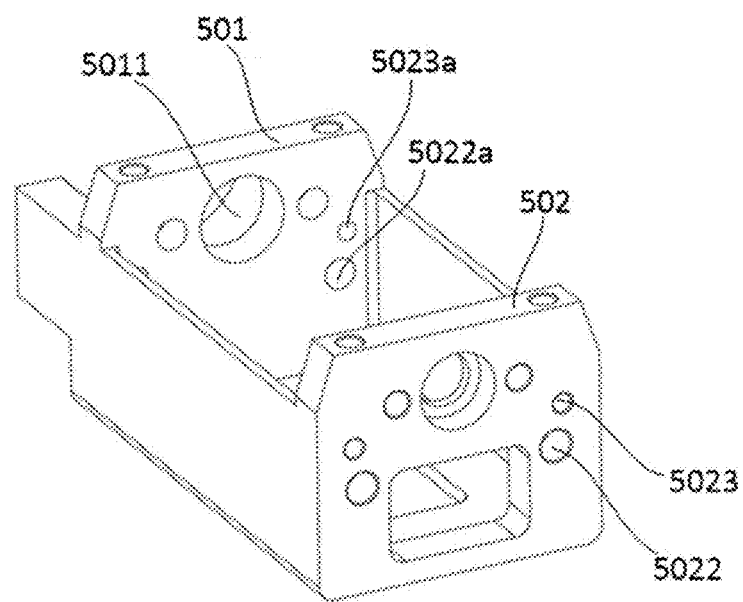
FIG. 14 is a schematic structural diagram of a bracket of a biomimetic dexterous finger shown in FIG. 10 viewed from another perspective.

As shown in FIG. 13, when the driving assembly 200 controls the driving screw rod 201 to rotate and makes the finger body 100 bend towards or away from the center of the palm, both the first flexible mechanism 610 and the second flexible mechanism 620 can move along the second horizontal direction (the y direction in FIG. 3), and the moving direction of the first flexible mechanism 610 and the moving direction of the second flexible mechanism 620 are the same.

The first connecting rod 401 and the second connecting rod 402 drive the first flexible mechanism 610 and the second flexible mechanism 620 to move forward along the second horizontal direction (the y direction in FIG. 4) respectively; and both the first flexible mechanism 610 and the second flexible mechanism 620 are elastically deformed, causing the finger body 100 to bend away from the center of the palm.

The first connecting rod 401 drives the first flexible mechanism 610 to move backward along the second horizontal direction (the y direction in FIG. 4) and the second connecting rod 402 drives the second flexible mechanism 620 to move backward along the second horizontal direction; and both the first flexible mechanism 610 and the second flexible mechanism 620 are elastically deformed, causing the finger body 100 to bend close to the center of the palm.

In another embodiment of the present disclosure, along a vertical direction, the moving mechanism 300 has a bottom surface, where the bottom surface is provided with a third connecting protrusion, and the flexible mechanism is connected to the third connecting protrusion; and the connecting mechanism includes a third connecting rod, one end of the third connecting rod is rotatably connected to the flexible mechanism, and the other end of the third connecting rod is rotatably connected to the finger root of the finger body 100.

That is to say, unlike the above-mentioned solution in which the left side and the right side of the moving mechanism 300 are each provided with the flexible mechanism 610, only one flexible mechanism is provided at the bottom of the moving mechanism in this solution, which can also achieve the effects of impact resistance and shock absorption.

As shown in FIGS. 2, 5, 7, 8 and 9, in the embodiments of the present disclosure, the first flexible mechanism 610 may include a first connecting block 601, a first lower connecting rod 602, a first front spring 603 and a first rear spring 604.

The first connecting block 601 is provided with a first connecting hole 6013, the first connecting hole 6013 has a first central axis parallel to the first horizontal direction (the x axis shown in FIG. 8), and one end of the first connecting rod 401 is rotatably connected to the first connecting hole 6013.

The first connecting block 601 is further provided with a first protruding block 6011 and a second protruding block 6012 which are opposite to each other and spaced apart in the second horizontal direction (the y axis shown in FIG. 8), the first protrusion 6011 is close to the finger body 100, and the first connecting protrusion 301 is provided between the first protruding block 6011 and the second protruding block 6012.

Figure 8:
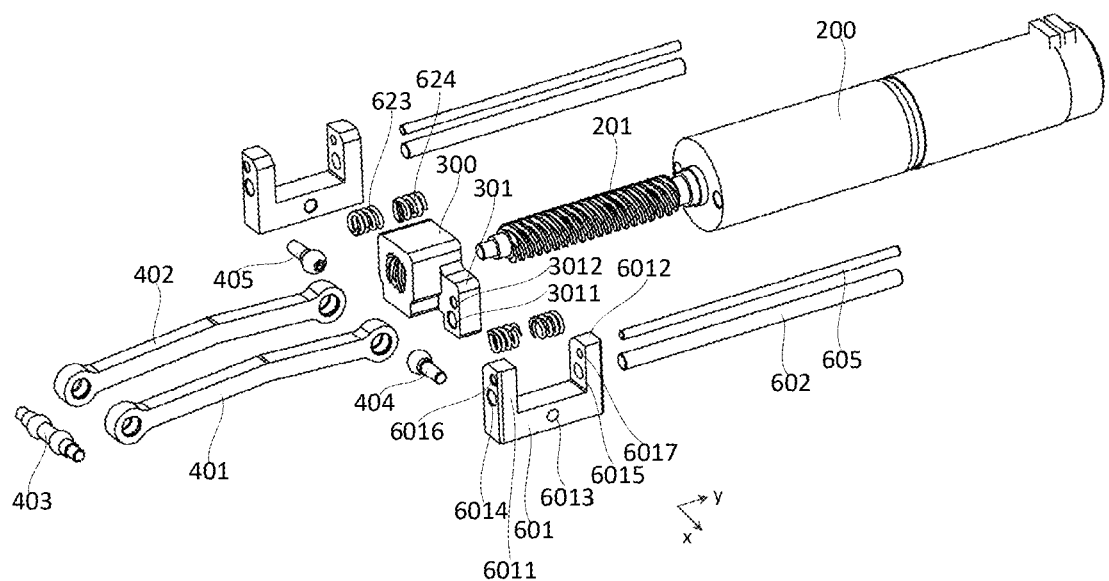
FIG. 8 is a second exploded view of portion A in FIG. 1.

The first protruding block 6011 is provided with a second connecting hole 6014, the second protruding block 6012 is provided with a third connecting hole 6015, the first connecting protrusion 301 is provided with a fourth connecting hole 3011; the second connecting hole 6014, the third connecting hole 6015 and the fourth connecting hole 3011 each have a second central axis, and the second central axis is parallel to the second horizontal direction (the y axis shown in FIG. 8).

The first lower connecting rod 602 is slidably connected with the second connecting hole 6014, the third connecting hole 6015 and the fourth connecting hole 3011, so that the first connecting protrusion 301 is connected with the first connecting block 601.

The first front spring 603 and the first rear spring 604 are both sleeved on the first lower connecting rod 602, one end of the first front spring 603 and other end of the first front spring 603 along an elastic expansion and contraction direction of the first front spring 603 are respectively abutted against the first protruding block 6011 and the first connecting protrusion 301, and one end of the first rear spring 604 and other end of the first rear spring 604 along the elastic expansion and contraction direction of the first rear spring 604 are respectively abutted against the second protruding block 6012 and the first connecting protrusion 301.

The second flexible mechanism 620 may include: a second connecting block 621, a second lower connecting rod 622, a second front spring 623 and a second rear spring 624. The structure of the second flexible mechanism 620 is the same as that of the first flexible mechanism 610, which will not be repeated herein.

When the finger body 100 swings laterally, it drives the first connecting rod 401 to swing, the first connecting rod 401 drives the first connecting block 601 to move, and the first front spring 603 or the first rear spring 604 is compressed to be elastically deformed, so as to counteract most of the impact force.

When the driving assembly 200 drives the connecting mechanism 400, the first front spring 603 and the first rear spring 604 are also compressed and elastically deformed so as to counteract most of the impact force, thereby enabling the driving assembly 200 to have a better flexible output characteristic.

That is to say, the flexible mechanism according to the embodiments of the present disclosure can not only alleviate the force when the driving assembly 200 outputs, but also alleviate the impact of external force, thereby achieving the effect of bidirectional shock absorption.

With further reference to FIGS. 2, 5, 7, 8 and 9, the first protruding block 6011 is provided with a fifth connecting hole 6016, the second protruding block 6012 is provided with a sixth connecting hole 6017, and the first connecting protrusion 301 is provided with a seventh connecting hole 3012, where central axes of the fifth connecting hole 6016, the sixth connecting hole 6017 and the seventh connecting hole 3012 coincide with each other; the central axis of the fifth connecting hole 6016 is parallel to the second horizontal direction (the y axis shown in FIG. 8); and the central axis of the fifth connecting hole 6016 is spaced apart from the second central axis in the vertical direction and is located above the second central axis.

In the embodiments of the present disclosure, the first flexible mechanism 610 further includes: a first upper connecting rod 605, which is slidably connected with each of the fifth connecting hole 6016, the sixth connecting hole 6017 and the seventh connecting hole 3012.

A diameter of the first upper connecting rod 605 is smaller than that of the first lower connecting rod 602.

The first lower connecting rod 602 is configured to be connected to the first front spring 603 and the first rear spring 604; the first lower connecting rod 602 and the first upper connecting rod 605 are able to be used to fix the first connecting block 601 simultaneously; and the first lower connecting rod 602 and the first upper connecting rod 605 also serve as guide rails, enabling the first connecting block 601 to move along the first lower connecting rod 602 and the first upper connecting rod 605.

If only the first lower connecting rod 602 is provided, the first lower connecting rod 602 will rotate about the y-axis as shown in FIG. 7, while the first upper connecting rod 605 and the first lower connecting rod 602 are arranged at intervals, which can restrict the rotation of the first lower connecting rod 602, thereby ensuring the installation stability of the first flexible mechanism 610.

The second flexible mechanism 620 may also include a second upper connecting rod 625, and the structure of the second flexible mechanism 620 is the same as that of the first flexible mechanism 610, which will not be repeated herein.

Figure 10:
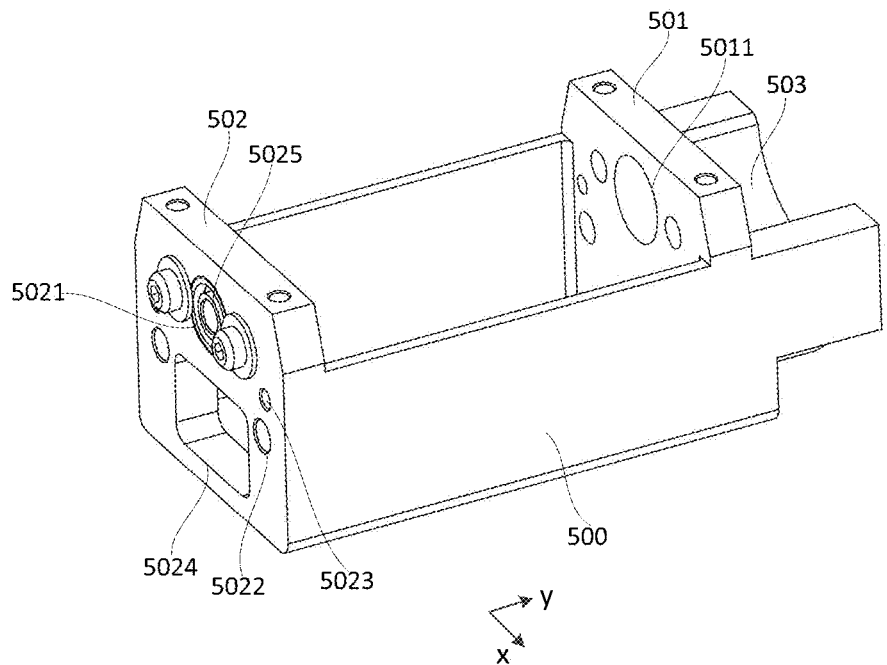
FIG. 10 is a schematic structural diagram of a bracket of a biomimetic dexterous finger provided by an embodiment of the present disclosure.

Referring to FIGS. 2, 7 and 10, in the embodiments of the present disclosure, the biomimetic dexterous finger further includes a bracket 500, which includes a first sidewall 501 and a second sidewall 502 along the second horizontal direction (the y-axis shown in FIG. 10), where the first sidewall 501 is provided with a first through-hole 5011, the second sidewall 502 is provided with a second through-hole 5021, the driving screw rod 201 is provided in the bracket 500 from the first through-hole 5011, a bearing seat 5025 is provided inside the second through-hole 5021, and an end of the driving screw rod 201 is rotatably connected to the bearing seat 5025.

The bracket 500 can provide isolation and protection for the driving screw rod 201, so as to avoid interference with other components and ensure the rotation of the driving screw rod 201.

Meanwhile, the moving mechanism 300 and the flexible mechanism are also provided in the bracket 500.

The second sidewall 502 is further provided with an avoidance opening 5024, one end of the connecting mechanism 400 is provided in the bracket 500, and the other end of the connecting mechanism 400 extends out of the bracket 500 from the avoidance opening 5024 and is rotatably connected to the finger root of the finger body 100.

The bracket 500 can provide isolation and protection for the moving mechanism 300, the flexible mechanism, the connecting mechanism 400, etc., avoiding interference with other components, improving the mounting stability of the moving mechanism 300, the flexible mechanism, the connecting mechanism 400, etc., and meantime making the overall structure compact.

With continued reference to FIGS. 2, 7, 10 and 14, in the embodiments of the present disclosure, the first sidewall 501 is further provided with a third through-hole 5022a, the second sidewall 502 is further provided with a fourth through-hole 5022, and one end of the first lower connecting rod 602 and other end of the first lower connecting rod 602 along the second horizontal direction (the y-axis shown in FIG. 10) are respectively fixedly connected to the third through-hole 5022a and the fourth through-hole 5022. That is, one end of the first lower connecting rod 602 along the second horizontal direction is fixedly connected with the third through-hole 5022a, and the other end of the first lower connecting rod 602 is fixedly connected with the fourth through-hole 5022.

The first sidewall 501 is further provided with a fifth through-hole 5023a, the second sidewall 502 is further provided with a sixth through-hole 5023, and one end of the first upper connecting rod 605 and other end of the first upper connecting rod 605 along the second horizontal direction (the y-axis shown in FIG. 10) are respectively fixedly connected with the fifth through-hole 5023a and the sixth through-hole 5023.

The first lower connecting rod 602 and the first upper connecting rod 605 are fixed on the bracket 500, which further improves the installation stability of the flexible mechanism and ensures the cushioning function of the flexible mechanism.

Referring to FIGS. 2 and 10, in the embodiments of the present disclosure, an arc-shaped support plate 503 is provided on an outer wall surface of the first sidewall 501 away from the second sidewall 502, and the driving assembly 200 is provided on the arc-shaped support plate 503.

The arc-shaped support plate 503 is configured to support the driving assembly 200, and provide a supporting force for the driving assembly 200, so as to prevent uneven force distribution of the driving assembly 200 due to its own gravity, which affects the output of the driving screw rod 201.

Referring to FIGS. 7, 8, 11 and 12, in the embodiments of the present disclosure, the connecting mechanism 400 further includes a first ball head rod 404 and a second ball head rod 405, where the first ball head rod 404 includes a first ball head 4042 and a first rod segment 4041 that are adjacent to each other along the first horizontal direction (the x-axis shown in FIG. 11); and the second ball head rod 405 includes a second ball head 4052 and a second rod segment 4051 that are adjacent to each other along the first horizontal direction.

One end of the first connecting rod 401 is provided with a first annular connecting member 4011, the first annular connecting member 4011 is rotatably connected to the first ball head 4042, and the first rod segment 4041 is fixedly connected to the first flexible mechanism 610. The first rod segment 4041 is fixedly connected with the first connecting hole 6013 provided in the first connecting block 601.

One end of the second connecting rod 402 is provided with a second annular connecting member 4021, the second annular connecting member 4021 is rotatably connected to the second ball head 4052, and the second rod segment 4051 is fixedly connected to the second flexible mechanism 620.

The connecting mechanism 400 further includes a third ball head rod 403 having a first end and a second end opposite to each other, and both the first end and the second end are fixedly connected to the finger root of the finger body 100. The third ball head rod 403 is further provided with a third ball head 4031 and a fourth ball head 4032 that are spaced apart from each other along the first horizontal direction (the x-axis shown in FIG. 11). The other end of the first connecting rod 401 is provided with a third annular connecting member 4012, the other end of the second connecting rod 402 is provided with a fourth annular connecting member 4022, the third annular connecting member 4012 is rotatably connected to the third ball head 4031, and the fourth annular connecting member 4022 is rotatably connected to the fourth ball head 4032.

The design of the first ball head rod 404, the second ball head rod 405 and the third ball head rod 403 enables the connecting mechanism 400 to be rotatably connected to the finger body 100, as well as the flexible mechanism, thereby ensuring the lifting and lowering functions of the finger body 100.

Figure 9:
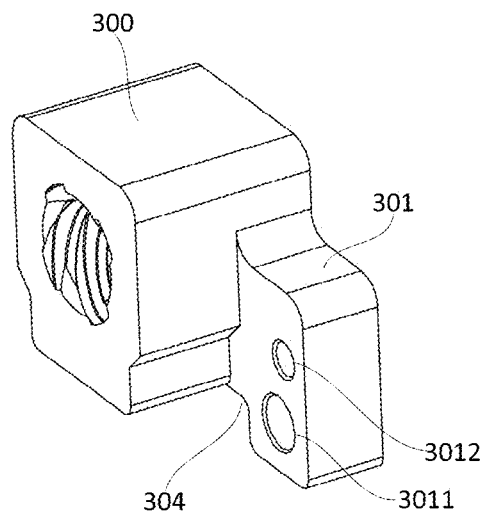
FIG. 9 is a schematic structural diagram of a moving mechanism of a biomimetic dexterous finger provided by an embodiment of the present disclosure.
Figure 11:
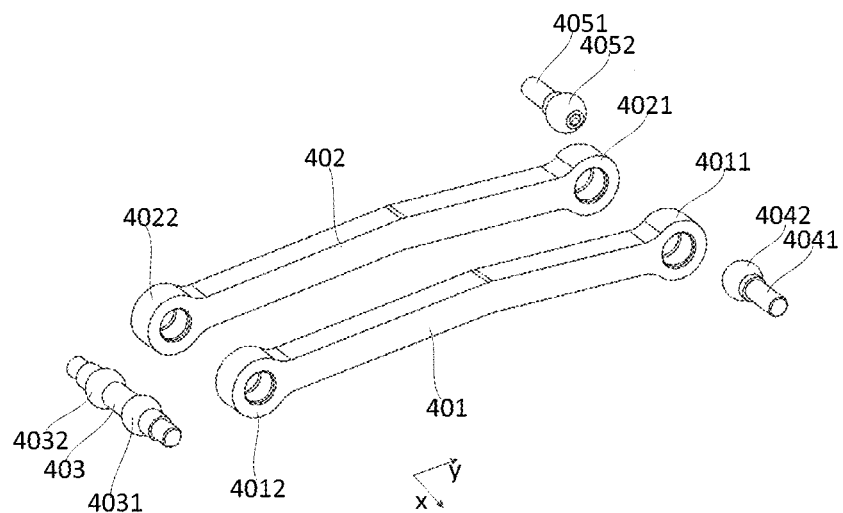
FIG. 11 is a schematic structural diagram of a connecting mechanism of a biomimetic dexterous finger provided by an embodiment of the present disclosure.
Figure 12:
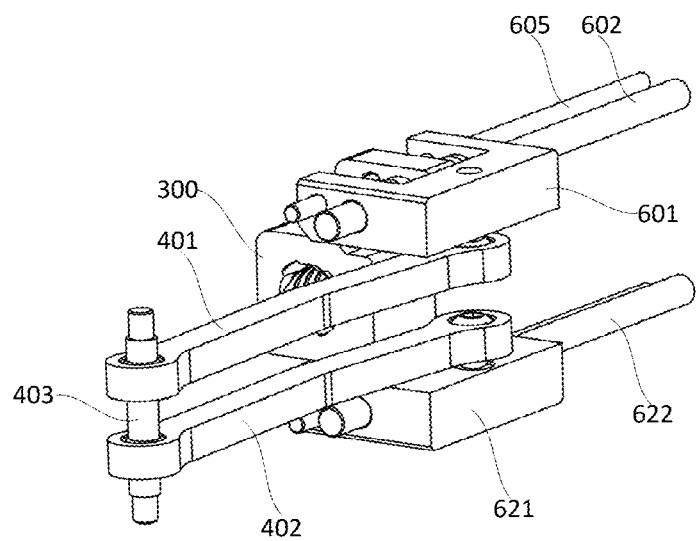
FIG. 12 is a schematic diagram of connection between a connecting mechanism and a flexible mechanism of a biomimetic dexterous finger provided by an embodiment of the present disclosure.

With continued reference to FIGS. 9 and 11, the first connecting protrusion 301 is further provided with an avoidance groove 304, and the first annular connecting member 4011 is rotatably connected to the first ball head 4042 through the avoidance groove 304.

The actual usage state of the biomimetic dexterous finger provided in the present disclosure will be further described below through the specific embodiments.

Embodiment 1

The driving assembly 200 drives the finger body 100 to bend.

The driving assembly 200 works and enables the driving screw rod 201 to rotate, and the driving screw rod 201 drives the moving mechanism 300 engaged therewith to move forward and backward along a direction of the solid arrow shown in FIG. 1. The left and right ends of the moving mechanism 300 are not directly connected to the first connecting block 601 and the second connecting block 621, but are flexibly connected to them through the first front spring 603, the first rear spring 604, the second front spring 623 and the second rear spring 624. The first ball head 4042 is fixedly connected to the first connecting block 601, and is rotatably connected to the first connecting rod 401. The second ball head 4052 is fixedly connected to the second connecting block 621, and is rotatably connected to the second connecting rod 402. The first connecting rod 401 and the second connecting rod 402 are also each rotatably connected to the finger root of the finger body 100.

As shown in FIGS. 1 and 13, when the driving screw rod 201 drives the moving mechanism 300 to move forward along the direction of the solid arrow shown in FIG. 1, since the first connecting block 601 and the second connecting block 621 remain stationary, the moving mechanism 300 will compress the first front spring 603 and the second front spring 623 to make them undergo elastic deformation and meantime drive the first connecting block 601 and the second connecting block 621 to move forward. That is to say, at this point, the moving direction of the first flexible mechanism 610 and the moving direction of the second flexible mechanism 620 are the same, the first flexible mechanism 610 and the second flexible mechanism 620 will move along an axial direction of the driving screw rod 201, and the axial direction of the driving screw rod 201 is parallel to the direction indicated by the solid arrow in FIG. 1; and the first flexible mechanism 610 and the second flexible mechanism 620 move forward.

Since one end of the first connecting rod 401 is rotatably connected to the first connecting block 601 via the first ball head 4042, and one end of the second connecting rod 402 is rotatably connected to the second connecting block 621 via the second ball head 4052; and the other end of the first connecting rod 401 is rotatably connected to the finger body 100 via the third ball head 4031, and the other end of the second connecting rod 402 is rotatably connected to the finger body 100 via the fourth ball head 4032, the first connecting rod 401 and the second connecting rod 402 can be driven to rotate around the X axis when the first connecting block 601 and the second connecting block 621 move forward, causing the finger body 100 to bend away from the center of the palm.

Similarly, as shown in FIG. 13, when the driving screw rod 201 drives the moving mechanism 300 to move backward along the direction of the solid arrow shown in FIG. 1, the moving mechanism 300 will compress the first rear spring 604 and the second rear spring 624 to make them undergo elastic deformation and meantime drive the first connecting block 601 and the second connecting block 621 to move backward. At this moment, the moving direction of the first flexible mechanism 610 and the moving direction of the second flexible mechanism 620 are the same, the first flexible mechanism 610 and the second flexible mechanism 620 will move along the axial direction of the driving screw rod 201, and the axial direction of the driving screw rod 201 is parallel to the direction indicated by the solid arrow in FIG. 1; and the first flexible mechanism 610 and the second flexible mechanism 620 move backward.

When the first connecting block 601 and the second connecting block 621 move backward, the first connecting rod 401 and the second connecting rod 402 are driven to rotate around the X axis, causing the finger body 100 to bend close to the center of the palm.

That is to say, the output force of the driving assembly 200 is absorbed by the deformation of the springs and does not directly act on the first connecting block 601, the second connecting block 621, the first connecting rod 401 and the second connecting rod 402, so that the driving assembly 200 has a better flexible output characteristic.

Embodiment 2

When the driving assembly 200 drives the finger body 100 to bend, it is impacted by an external force in a direction identical to or opposite to the bending direction.

When the driving screw rod 201 drives the moving mechanism 300 to move forward along the direction of the solid arrow shown in FIG. 1, the moving mechanism 300 will compress the first front spring 603 and the second front spring 623 to make them undergo elastic deformation, thereby driving the finger body 100 to bend away from the center of the palm. Meanwhile, the finger body 100 is subjected to an impact force in a direction of the dashed arrow shown in FIG. 1, the impact force causes the finger body 100 to move away from the center of the palm, and the first connecting rod 401 and the second connecting rod 402 will drive the first connecting block 601 and the second connecting block 621 to move forward in the direction of the solid arrow shown in FIG. 1. At this time, a compressing force of the moving mechanism 300 on the first front spring 603 and the second front spring 623 will be decreased, and the elastic deformation of the first front spring 603 and the second front spring 623 will also be decreased. However, at this time, the movement of the first connecting block 601 and the second connecting block 621 may in turn compress the first rear spring 604 and the second rear spring 624 to make them deform elastically, thereby counteracting the impact force.

Similarly, as shown in FIG. 13, when the driving screw rod 201 drives the moving mechanism 300 to move backward along the direction of the solid arrow shown in FIG. 1, the moving mechanism 300 will compress the first rear spring 604 and the second rear spring 624 to make them deform elastically, thereby driving the finger body 100 to bend close to the center of the palm. Meanwhile, the finger body 100 is subjected to the impact force in the direction of the dashed arrow shown in FIG. 1, the impact force causes the finger body 100 to continue bending close to the center of the palm, and the first connecting rod 401 and the second connecting rod 402 will drive the first connecting block 601 and the second connecting block 621 to move forward in the direction of the solid arrow shown in FIG. 1. At this moment, due to the combined action of the moving mechanism 300, the first connecting block 601 and the second connecting block 621, the compressing force on the first rear spring 604 and the second rear spring 624 will be increased, thereby counteracting the impact force.

Embodiment 3

When the driving assembly 200 drives the finger body 100 to bend, it is impacted by an external force in a lateral swing direction.

Figure 6:
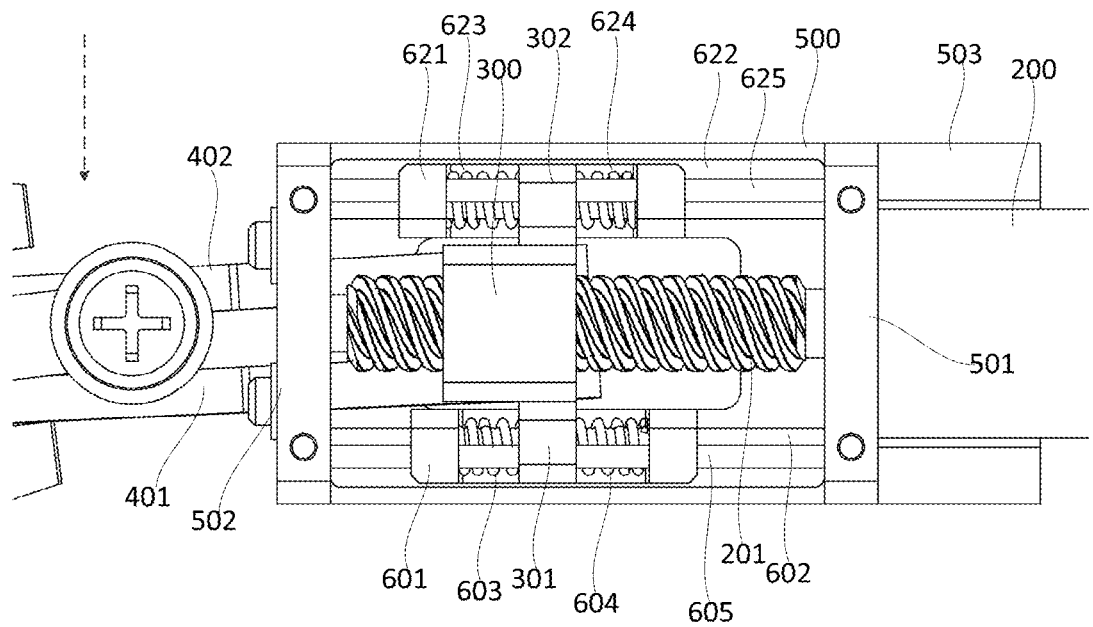
FIG. 6 is an enlarged view of portion B in FIG. 3.

When the driving screw rod 201 drives the moving mechanism 300 to move forward in the direction of the solid arrow shown in FIG. 6, the moving mechanism 300 will compress the first front spring 603 and the second front spring 623 to make them undergo elastic deformation, thereby driving the finger body 100 to bend away from the center of the palm. Meanwhile, the finger body 100 is subjected to the impact force in the direction of the dashed arrow shown in FIG. 6, and the impact force causes the finger body 100 to swing laterally while bending away from the center of the palm. The first connecting rod 401 drives the first connecting block 601 to move backward, the second connecting rod 402 drives the second connecting block 621 to move forward, the moving mechanism 300 and the first connecting block 601 compress the first front spring 603, and the moving mechanism 300 and the second connecting block 621 compress the second rear spring 624, so that the first front spring 603 is further compressed, thereby counteracting the impact force.

When the driving screw rod 201 drives the moving mechanism 300 to move backward along the direction of the solid arrow shown in FIG. 13, the moving mechanism 300 will compress the first rear spring 604 and the second rear spring 624 to make them undergo elastic deformation, thereby driving the finger body 100 to bend towards the center of the palm. Meanwhile, the finger body 100 is subjected to the impact force in the direction of the dashed arrow shown in FIG. 5, and the impact force causes the finger body 100 to swing laterally while bending toward the center of the palm. The first connecting rod 401 drives the first connecting block 601 to move forward, the second connecting rod 402 drives the second connecting block 621 to move backward, the moving mechanism 300 and the first connecting block 601 compress the first rear spring 604, and the moving mechanism 300 and the second connecting block 621 compress the second front spring 623, so that the first rear spring 604 is further compressed, thereby counteracting the impact force.

Embodiment 4

The driving assembly 200 stops working, and the finger body 100 bends under the impact of an external force.

The finger body 100 is subjected to the impact force in the direction of the dashed arrow shown in FIG. 1, the impact force causes the finger body 100 to move away from the center of the palm, and the first connecting rod 401 and the second connecting rod 402 will drive the first connecting block 601 and the second connecting block 621 to move forward in the direction of the solid arrow shown in FIG. 1. At this moment, because the moving mechanism 300 remains stationary, the movement of the first connecting block 601 and the second connecting block 621 will compress the first rear spring 604 and the second rear spring 624 to make them undergo elastic deformation, thereby counteracting the impact force.

Similarly, when the finger body 100 is subjected to the impact force in a direction opposite to the direction of the dashed arrow shown in FIG. 1, the impact force causes the finger body 100 to bend towards the center of the palm, and the first connecting rod 401 and the second connecting rod 402 will drive the first connecting block 601 and the second connecting block 621 to move backward along the direction of the solid arrow shown in FIG. 1. At this moment, because the moving mechanism 300 remains stationary, the movement of the first connecting block 601 and the second connecting block 621 will compress the first front spring 603 and the second front spring 623 to make them undergo elastic deformation, thereby counteracting the impact force.

It should be noted that, after the impact force disappears, the first rear spring 604 and the second rear spring 624, or the first front spring 603 and the second front spring 623 reset, and the finger body 100 will return to its initial bending position.

Embodiment 5

When the driving assembly 200 stops working, and the finger body 100 is impacted by an external force, causing lateral swinging.

When the finger body 100 is subjected to the impact force in the direction of the dashed arrow shown in FIG. 6, the finger body 100 swings laterally in the direction of the first connecting block 601, causing the first connecting rod 401 to drive the first connecting block 601 to move backward, and the second connecting rod 402 to drive the second connecting block 621 to move forward. That is to say, the moving direction of the first flexible mechanism 610 and the moving direction of the second flexible mechanism 620 are opposite to each other at this moment.

In addition, when the driving assembly 200 stops working, the driving screw rod 201 stops rotating and the moving mechanism 300 remains stationary, so that the second rear spring 624 and the first front spring 603 are compressed and elastically deformed, thereby counteracting the impact force.

When the finger body 100 is subjected to the impact force in the direction of the dashed arrow shown in FIG. 5, the finger body 100 swings laterally in the direction of the second connecting block 621, so that the first connecting rod 401 drives the first connecting block 601 to move forward, and the second connecting rod 402 drives the second connecting block 621 to move backward. That is to say, the moving direction of the first flexible mechanism 610 and the moving direction of the second flexible mechanism 620 are opposite to each other at this moment.

In addition, when the driving assembly 200 stops working, the driving screw rod 201 stops rotating and the moving mechanism 300 remains stationary, so that the first rear spring 604 and the second front spring 623 are compressed and elastically deformed, thereby counteracting the impact force.

It should be noted that, when the impact force disappears, the first rear spring 604 and the second front spring 623, or the second rear spring 624 and the first front spring 603 reset, and the finger body 100 will return to its initial position.

The embodiments of the present disclosure further provide a biomimetic robot, including the biomimetic dexterous finger described above.

In conclusion, the embodiments of the present disclosure provide the biomimetic dexterous finger and the biomimetic robot. The biomimetic dexterous finger includes: the finger body 100, the driving assembly 200 and the transmission assembly, where the driving assembly 200 is provided at the metacarpophalangeal joint of the palm, and the driving screw rod 201 of the driving assembly 200 is connected to the finger root of the finger body 100, so that the driving assembly 200 can drive the finger body 100 to swing laterally. The transmission assembly includes: the moving mechanism 300, the connecting mechanism 400 and the flexible mechanism, where the moving mechanism 300 is in transmission connection with the driving screw rod 201, and when the driving assembly 200 controls the driving screw rod 201 to rotate, the moving mechanism 300 can move on the driving screw rod 201; the flexible mechanism is connected to the moving mechanism 300, one end of the connecting mechanism 400 is rotatably connected to the flexible mechanism, and the other end of the connecting mechanism 400 is rotatably connected to the finger root of the finger body 100. When the driving assembly 200 does not control the driving screw rod 201 to rotate and the right or left side of the finger body 100 is subjected to the external force, the finger body 100 will swing laterally along the first horizontal direction (the left-right direction of the finger body 100 in FIG. 1) and drive the connecting mechanism 400 to swing left or right, and when the connecting mechanism 400 swings left or right, a pulling force will be applied to the flexible mechanism. Since the driving screw rod 201 stops rotating at this moment, the moving mechanism 300 remains stationary on the driving screw rod 201, and the flexible mechanism is subjected to forces in different directions which are simultaneously applied by the moving mechanism 300 and the connecting mechanism 400, so that the flexible mechanism is elastically deformed, and when the flexible mechanism is elastically restored, the flexible mechanism drives the finger body 100 to reset. At the same time, the elastic deformation of the flexible mechanism can also counteract most of the impact force, so as to achieve the effects of impact resistance and shock absorption, and prevent the finger root of the finger body 100 from being damaged when subjected to the impact of external force.

Further, when the driving assembly 200 controls the driving screw rod 201 to rotate, the moving mechanism 300 drives the flexible mechanism to move. However, at this moment, the connecting mechanism 400 remains stationary, and the flexible mechanism is subjected to pulling forces in different directions which are simultaneously applied by the moving mechanism 300 and the connecting mechanism 400, so that the flexible mechanism is elastically deformed. The driving assembly 200 drives the flexible mechanism to be elastically deformed while driving the connecting mechanism 400 to lead the finger body 100 to bend towards or away from the center of the palm. The elastic deformation of the flexible mechanism can counteract part of the output force of the driving assembly 200. That is to say, the drive of the driving assembly 200 on the connecting mechanism 400 is also firstly transmitted to the finger body 100 through the flexible mechanism, so that the driving assembly 200 has a better flexible output characteristic, which provides a certain protection effect on the driving assembly 200.

The embodiments or examples in the specification are described in a progressive manner, with each embodiment emphasizing its differences from other embodiments. The same and similar parts between the embodiments can be referred to each other.

It should be noted that the expressions "one embodiment", "embodiments", "exemplary embodiment", "some embodiments", etc. mentioned in the specification indicate that the described embodiments may include specific features, structures, or characteristics, but not every embodiment necessarily includes such specific features, structures, or characteristics. Furthermore, such phrases may not necessarily refer to the same embodiment. In addition, when the specific features, structures, or characteristics are described in conjunction with the embodiments, other embodiments that are explicitly or implicitly described can be combined to implement such features, structures, or characteristics, which is within the knowledge of those skilled in the art.

In general, the terms should be at least partially understood from usage in the context. For example, at least partially depending on the context, the term "one or more" used herein may be used to describe any feature, structure, or characteristic in the singular sense, or may be used to describe a combination of features, structures, or characteristics in the plural sense. Similarly, at least partially depending on the context, the terms such as "a" or "the" may also be understood as conveying singular or plural usage.

It should be readily understood that the terms "on", "above", and "over" in the present disclosure should be interpreted in the broadest sense, so that the term "on" not only means "directly on something", but also includes the meaning of "on something" with an intermediate feature or layer therebetween. Furthermore, the term "above" or "over" not only includes the meaning of "above something" or "over something", but also includes the meaning of "above something" or "over something" without any intermediate feature or layer therebetween (i.e., directly on something).

Furthermore, for the convenience of description, the spatial relative terms such as "below", "under", "beneath", "on", "above", etc., may be used in the text to describe the relationship of one element or feature relative to other elements or features as shown in the figures. The spatial relative terms are intended to encompass different orientations of the device in use or operation, in addition to the orientations shown in the accompanying drawings. The device may have other orientations (rotated by 90 degrees or in other orientations) and the spatial relative descriptions in the text may also be interpreted accordingly.

Finally, it should be noted that the above-mentioned embodiments are merely intended to describing the technical solutions of the present disclosure rather than limiting the present disclosure. Although the present disclosure is described in detail with reference to the above-mentioned embodiments, those ordinary skilled in the art should understand that they may still make modifications to the technical solutions described in the above-mentioned embodiments, or make equivalent replacements to some or all technical features thereof. These modifications or replacements do not make the essence of the corresponding technical solutions depart from the scope of the technical solutions in the embodiments of the present disclosure.

What is claimed is:

1. A biomimetic dexterous finger, comprising: a finger body, a driving assembly and a transmission assembly; wherein
   the driving assembly is provided at a metacarpophalangeal joint of a palm, and a driving screw rod is extended outwards from the driving assembly;
   the transmission assembly comprises a moving mechanism, a connecting mechanism, a first flexible mechanism and a second flexible mechanism, wherein the moving mechanism is in transmission connection with the driving screw rod, the moving mechanism has a first wall surface and a second wall surface that are opposite to each other along a first horizontal direction, the first flexible mechanism is connected to a first connecting protrusion on the first wall surface, and the second flexible mechanism is connected to a second connecting protrusion on the second wall surface;
   the connecting mechanism comprises a first connecting rod and a second connecting rod, wherein a first end of the first connecting rod and a second end of the first connecting rod are respectively rotatably connected to the first flexible mechanism and a finger root of the finger body, and a first end of the second connecting rod and a second end of the second connecting rod are respectively rotatably connected to the second flexible mechanism and the finger root;
   the first flexible mechanism and the second flexible mechanism are both capable of moving along a second horizontal direction, and the second horizontal direction is perpendicular to the first horizontal direction;
   the driving assembly drives the first flexible mechanism and the second flexible mechanism to be elastically deformed and drives the first connecting rod and the second connecting rod to lead the finger body to bend towards or away from a center of the palm;
   when the driving assembly stops working and the finger body is subjected to an external force along the first horizontal direction, the finger body drives the first connecting rod and the second connecting rod to swing along the first horizontal direction, the first connecting rod drives the first flexible mechanism to be elastically deformed and the second connecting rod drives the second flexible mechanism to be elastically deformed, and the first flexible mechanism and the second flexible mechanism are elastically restored to drive the finger body to reset; or
   when the driving assembly works and the finger body is subjected to an external force in any direction, the finger body drives the first connecting rod and the second connecting rod to swing, the first connecting rod drives the first flexible mechanism to be elastically deformed and the second connecting rod drives the second flexible mechanism to be elastically deformed, and the first flexible mechanism and the second flexible mechanism are elastically restored to drive the finger body to reset.

2. The biomimetic dexterous finger according to claim 1, wherein
   the first flexible mechanism comprises: a first connecting block, a first lower connecting rod, a first front spring and a first rear spring;
   the first connecting block is provided with a first connecting hole, the first connecting hole has a first central axis parallel to the first horizontal direction, and the first end of the first connecting rod is rotatably connected to the first connecting hole;
   the first connecting block is further provided with a first protruding block and a second protruding block which are opposite to each other and spaced apart along the second horizontal direction, and the first connecting protrusion is provided between the first protruding block and the second protruding block;
   the first protruding block is provided with a second connecting hole, the second protruding block is provided with a third connecting hole, the first connecting protrusion is provided with a fourth connecting hole, the second connecting hole, the third connecting hole and the fourth connecting hole each have a second central axis, and the second central axis is parallel to the second horizontal direction;
   the first lower connecting rod is slidably connected with each of the second connecting hole, the third connecting hole and the fourth connecting hole; and
   the first front spring and the first rear spring are both sleeved on the first lower connecting rod, a first end of the first front spring and a second end of the first front spring along an elastic expansion and contraction direction of the first front spring are respectively abutted against the first protruding block and the first connecting protrusion, and a first end of the first rear spring and a second end of the first rear spring along an elastic expansion and contraction direction of the first rear spring are respectively abutted against the second protruding block and the first connecting protrusion.

3. The biomimetic dexterous finger according to claim 2, wherein
   the first flexible mechanism further comprises a first upper connecting rod;
   the first protruding block is provided with a fifth connecting hole, the second protruding block is provided with a sixth connecting hole, the first connecting protrusion is provided with a seventh connecting hole, central axes of the fifth connecting hole, the sixth connecting hole and the seventh connecting hole coincide with each other, the central axis of the fifth connecting hole is spaced apart from the second central axis in a vertical direction, and the central axis of the fifth connecting hole is parallel to the second horizontal direction; and
   the first upper connecting rod is slidably connected with each of the fifth connecting hole, the sixth connecting hole and the seventh connecting hole.

4. The biomimetic dexterous finger according to claim 3, wherein the biomimetic dexterous finger further comprises a bracket;
   both the moving mechanism and the flexible mechanism are provided inside the bracket;
   the bracket comprises a first sidewall and a second sidewall along the second horizontal direction, wherein the first sidewall is provided with a first through-hole, the second sidewall is provided with a second through-hole, the driving screw rod is provided in the bracket from the first through-hole, a bearing seat is provided inside the second through-hole, and an end of the driving screw rod is rotatably connected to the bearing seat; and the second sidewall is further provided with an avoidance opening, a first end of the connecting mechanism is provided in the bracket, and a second end of the connecting mechanism extends out of the bracket from the avoidance opening and is rotatably connected to the finger root of the finger body.

5. The biomimetic dexterous finger according to claim 4, wherein
the first sidewall is further provided with a third through-hole, the second sidewall is further provided with a fourth through-hole, and a first end of the first lower connecting rod and a second end of the first lower connecting rod along the second horizontal direction are respectively fixedly connected with the third through-hole and the fourth through-hole; and
the first sidewall is further provided with a fifth through-hole, the second sidewall is further provided with a sixth through-hole, and a first end of the first upper connecting rod and a second end of the first upper connecting rod along the second horizontal direction are respectively fixedly connected with the fifth through-hole and the sixth through-hole.

6. The biomimetic dexterous finger according to claim 4, wherein an arc-shaped support plate is provided on an outer wall surface of the first sidewall away from the second sidewall, and the driving assembly is provided on the arc-shaped support plate.

7. The biomimetic dexterous finger according to claim 1, wherein
the connecting mechanism further comprises a first ball head rod and a second ball head rod, the first ball head rod comprises a first ball head and a first rod segment that are adjacent to each other along the first horizontal direction, and the second ball head rod comprises a second ball head and a second rod segment that are adjacent to each other along the first horizontal direction;
the first end of the first connecting rod is provided with a first annular connecting member, the first annular connecting member is rotatably connected to the first ball head, and the first rod segment is fixedly connected to the first flexible mechanism;
the first end of the second connecting rod is provided with a second annular connecting member, the second annular connecting member is rotatably connected to the second ball head, and the second rod segment is fixedly connected to the second flexible mechanism;
the connecting mechanism further comprises a third ball head rod having a first end and a second end that are opposite to each other, and both the first end and the second end are fixedly connected to the finger root of the finger body; and
the third ball head rod is further provided with a third ball head and a fourth ball head that are spaced apart from each other along the first horizontal direction, the second end of the first connecting rod is provided with a third annular connecting member, the second end of the second connecting rod is provided with a fourth annular connecting member, the third annular connecting member is rotatably connected to the third ball head, and the fourth annular connecting member is rotatably connected to the fourth ball head.

8. A biomimetic robot, comprising the biomimetic dexterous finger according to claim 1.

9. The biomimetic robot according to claim 8, wherein
the first flexible mechanism comprises: a first connecting block, a first lower connecting rod, a first front spring and a first rear spring;
the first connecting block is provided with a first connecting hole, the first connecting hole has a first central axis parallel to the first horizontal direction, and the first end of the first connecting rod is rotatably connected to the first connecting hole;
the first connecting block is further provided with a first protruding block and a second protruding block which are opposite to each other and spaced apart along the second horizontal direction, and the first connecting protrusion is provided between the first protruding block and the second protruding block;
the first protruding block is provided with a second connecting hole, the second protruding block is provided with a third connecting hole, the first connecting protrusion is provided with a fourth connecting hole, the second connecting hole, the third connecting hole and the fourth connecting hole each have a second central axis, and the second central axis is parallel to the second horizontal direction;
the first lower connecting rod is slidably connected with each of the second connecting hole, the third connecting hole and the fourth connecting hole; and
the first front spring and the first rear spring are both sleeved on the first lower connecting rod, a first end of the first front spring and a second end of the first front spring along an elastic expansion and contraction direction of the first front spring are respectively abutted against the first protruding block and the first connecting protrusion, and a first end of the first rear spring and a second end of the first rear spring along an elastic expansion and contraction direction of the first rear spring are respectively abutted against the second protruding block and the first connecting protrusion.

10. The biomimetic robot according to claim 9, wherein
the first flexible mechanism further comprises a first upper connecting rod;
the first protruding block is provided with a fifth connecting hole, the second protruding block is provided with a sixth connecting hole, the first connecting protrusion is provided with a seventh connecting hole, central axes of the fifth connecting hole, the sixth connecting hole and the seventh connecting hole coincide with each other, the central axis of the fifth connecting hole is spaced apart from the second central axis in a vertical direction, and the central axis of the fifth connecting hole is parallel to the second horizontal direction; and
the first upper connecting rod is slidably connected with each of the fifth connecting hole, the sixth connecting hole and the seventh connecting hole.

11. The biomimetic robot according to claim 10, wherein the biomimetic dexterous finger further comprises a bracket;
both the moving mechanism and the flexible mechanism are provided inside the bracket;
the bracket comprises a first sidewall and a second sidewall along the second horizontal direction, wherein the first sidewall is provided with a first through-hole, the second sidewall is provided with a second through-hole, the driving screw rod is provided in the bracket from the first through-hole, a bearing seat is provided inside the second through-hole, and an end of the driving screw rod is rotatably connected to the bearing seat; and the second sidewall is further provided with an avoidance opening, a first end of the connecting mechanism is provided in the bracket, and a second end of the connecting mechanism extends out of the bracket from the avoidance opening and is rotatably connected to the finger root of the finger body.

12. The biomimetic robot according to claim 11, wherein
the first sidewall is further provided with a third through-hole, the second sidewall is further provided with a fourth through-hole, and a first end of the first lower connecting rod and a second end of the first lower connecting rod along the second horizontal direction are respectively fixedly connected with the third through-hole and the fourth through-hole; and
the first sidewall is further provided with a fifth through-hole, the second sidewall is further provided with a sixth through-hole, and a first end of the first upper connecting rod and a second end of the first upper connecting rod along the second horizontal direction are respectively fixedly connected with the fifth through-hole and the sixth through-hole.

13. The biomimetic robot according to claim 11, wherein an arc-shaped support plate is provided on an outer wall surface of the first sidewall away from the second sidewall, and the driving assembly is provided on the arc-shaped support plate.

14. The biomimetic robot according to claim 8, wherein
the connecting mechanism further comprises a first ball head rod and a second ball head rod, the first ball head rod comprises a first ball head and a first rod segment that are adjacent to each other along the first horizontal direction, and the second ball head rod comprises a second ball head and a second rod segment that are adjacent to each other along the first horizontal direction;
the first end of the first connecting rod is provided with a first annular connecting member, the first annular connecting member is rotatably connected to the first ball head, and the first rod segment is fixedly connected to the first flexible mechanism;
the first end of the second connecting rod is provided with a second annular connecting member, the second annular connecting member is rotatably connected to the second ball head, and the second rod segment is fixedly connected to the second flexible mechanism;
the connecting mechanism further comprises a third ball head rod having a first end and a second end that are opposite to each other, and both the first end and the second end are fixedly connected to the finger root of the finger body; and
the third ball head rod is further provided with a third ball head and a fourth ball head that are spaced apart from each other along the first horizontal direction, the second end of the first connecting rod is provided with a third annular connecting member, the second end of the second connecting rod is provided with a fourth annular connecting member, the third annular connecting member is rotatably connected to the third ball head, and the fourth annular connecting member is rotatably connected to the fourth ball head.

* * * * *